United States Patent
Yang et al.

(10) Patent No.: US 8,797,636 B2
(45) Date of Patent: Aug. 5, 2014

(54) LIGHT-ENHANCING STRUCTURE FOR ELECTROPHORETIC DISPLAY

(75) Inventors: Bo-Ru Yang, Banqiao (TW); Yao-Jen Hsieh, Zhubei (TW)

(73) Assignee: SiPix Imaging, Inc., Fremont, CA (US)

( * ) Notice: Subject to any disclaimer, the term of this patent is extended or adjusted under 35 U.S.C. 154(b) by 79 days.

(21) Appl. No.: 13/551,541

(22) Filed: Jul. 17, 2012

(65) Prior Publication Data

US 2014/0022624 A1    Jan. 23, 2014

(51) Int. Cl.
*G02B 26/00* (2006.01)
*G02F 1/167* (2006.01)

(52) U.S. Cl.
CPC ............ *G02F 1/167* (2013.01); *G02F 2203/02* (2013.01); *G02F 2203/03* (2013.01)
USPC ........................................................ 359/296

(58) Field of Classification Search
USPC ........................................................ 359/296
See application file for complete search history.

(56) References Cited

U.S. PATENT DOCUMENTS

| | | | |
|---|---|---|---|
| 3,756,693 A | 9/1973 | Ota | |
| 3,892,568 A | 7/1975 | Ota | |
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,525,866 B1 | 2/2003 | Lin et al. | |
| 6,538,801 B2 | 3/2003 | Jacobson et al. | |
| 6,600,534 B1 | 7/2003 | Tanaka et al. | |
| 6,650,462 B2 | 11/2003 | Katase | |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,751,007 B2 | 6/2004 | Liang et al. | |
| 6,829,078 B2 | 12/2004 | Liang et al. | |
| 6,864,875 B2 | 3/2005 | Drzaic et al. | |
| 6,947,203 B2 | 9/2005 | Kanbe | |
| 7,009,756 B2 | 3/2006 | Kishi et al. | |
| 7,034,987 B2 | 4/2006 | Schlangen | |

(Continued)

FOREIGN PATENT DOCUMENTS

| | | |
|---|---|---|
| CN | 1617033 | 5/2005 |
| EP | 1 089 118 | 4/2001 |

(Continued)

OTHER PUBLICATIONS

U.S. Appl. No. U.S. Appl. No. 13/633,788, filed Oct. 2, 2012, Wang et al.

(Continued)

*Primary Examiner* — James Jones
(74) *Attorney, Agent, or Firm* — Perkins Coie LLP

(57) ABSTRACT

The present invention is directed to a display device comprising a display fluid layer sandwiched between a first substrate layer and a second substrate layer, and a light-enhancing layer between the display fluid layer and the second substrate layer. The light-enhancing structure can enhance the colors displayed by the display device, especially the colors displayed through lateral switching of the charged pigment particles in an electrophoretic fluid.

8 Claims, 13 Drawing Sheets

(56) References Cited

U.S. PATENT DOCUMENTS

| | | |
|---|---|---|
| 7,038,655 B2 | 5/2006 | Herb et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,050,218 B2 | 5/2006 | Kanbe |
| 7,057,600 B2 | 6/2006 | Goden |
| 7,075,502 B1 | 7/2006 | Drzaic et al. |
| 7,226,550 B2 | 6/2007 | Hou et al. |
| 7,271,947 B2 | 9/2007 | Liang et al. |
| 7,283,199 B2 | 10/2007 | Aichi et al. |
| 7,312,916 B2 | 12/2007 | Pullen et al. |
| 7,342,556 B2 | 3/2008 | Oue et al. |
| 7,365,732 B2 | 4/2008 | Matsuda et al. |
| 7,411,719 B2 | 8/2008 | Paolini et al. |
| 7,417,787 B2 | 8/2008 | Chopra et al. |
| 7,492,505 B2 | 2/2009 | Liang et al. |
| 7,502,162 B2 | 3/2009 | Lin et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,652,656 B2 | 1/2010 | Chopra et al. |
| 7,679,599 B2 | 3/2010 | Kawai |
| 7,679,813 B2 | 3/2010 | Liang et al. |
| 7,760,419 B2 | 7/2010 | Lee |
| 7,782,292 B2 | 8/2010 | Miyasaka et al. |
| 7,821,702 B2 | 10/2010 | Liang et al. |
| 7,830,592 B1 | 11/2010 | Sprague et al. |
| 7,852,547 B2 | 12/2010 | Kim |
| 7,852,548 B2 | 12/2010 | Roh |
| 7,982,941 B2 | 7/2011 | Lin et al. |
| 8,072,675 B2 | 12/2011 | Lin et al. |
| 8,115,729 B2 | 2/2012 | Danner et al. |
| 8,120,838 B2 | 2/2012 | Lin et al. |
| 8,159,636 B2 | 4/2012 | Sun et al. |
| 8,169,690 B2 | 5/2012 | Lin et al. |
| 8,174,492 B2 | 5/2012 | Kim et al. |
| 8,237,892 B1 | 8/2012 | Sprague et al. |
| 8,355,196 B2 | 1/2013 | Yan et al. |
| 8,395,836 B2 | 3/2013 | Lin et al. |
| 8,422,116 B2 | 4/2013 | Sprague et al. |
| 8,477,405 B2 | 7/2013 | Ishii et al. |
| 8,520,296 B2 | 8/2013 | Wang et al. |
| 8,570,272 B2 | 10/2013 | Hsieh et al. |
| 2002/0033792 A1 | 3/2002 | Inoue |
| 2002/0171620 A1 | 11/2002 | Gordon et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2004/0051935 A1 | 3/2004 | Katase |
| 2004/0113884 A1 | 6/2004 | Albert et al. |
| 2004/0136048 A1 | 7/2004 | Arango et al. |
| 2004/0190115 A1 | 9/2004 | Liang et al. |
| 2004/0252361 A1 | 12/2004 | Machida et al. |
| 2004/0263947 A1 | 12/2004 | Drzaic et al. |
| 2005/0002088 A1* | 1/2005 | Ukigaya .................. 359/296 |
| 2005/0190431 A1 | 9/2005 | Matsuda |
| 2006/0197738 A1 | 9/2006 | Kawai |
| 2006/0245060 A1 | 11/2006 | Goto |
| 2007/0002008 A1 | 1/2007 | Tam |
| 2007/0080928 A1 | 4/2007 | Ishii et al. |
| 2007/0268556 A1 | 11/2007 | Chopra et al. |
| 2007/0273637 A1 | 11/2007 | Zhou et al. |
| 2008/0042928 A1 | 2/2008 | Schlangen et al. |
| 2008/0174531 A1 | 7/2008 | Sah |
| 2009/0034054 A1 | 2/2009 | Ikegami et al. |
| 2009/0251763 A1 | 10/2009 | Sprague et al. |
| 2010/0103502 A1 | 4/2010 | Jacobson et al. |
| 2010/0165005 A1 | 7/2010 | Sprague |
| 2010/0165448 A1 | 7/2010 | Sprague |
| 2011/0199671 A1 | 8/2011 | Amundson et al. |
| 2011/0217639 A1 | 9/2011 | Sprague |
| 2011/0234557 A1 | 9/2011 | Yang et al. |
| 2011/0261433 A1 | 10/2011 | Sprague et al. |
| 2011/0292094 A1 | 12/2011 | Lin |
| 2012/0007897 A1 | 1/2012 | Yang et al. |
| 2012/0134010 A1 | 5/2012 | Sprague et al. |
| 2013/0057463 A1 | 3/2013 | Zhang et al. |
| 2013/0176612 A1 | 7/2013 | Sprague et al. |

FOREIGN PATENT DOCUMENTS

| | | |
|---|---|---|
| JP | 2004-20818 | 6/2002 |
| JP | 2008-033335 | 2/2008 |
| JP | 2009-116041 | 5/2009 |
| JP | 2009-192637 | 8/2009 |
| KR | 10-2007-0082680 | 8/2007 |
| KR | 10-2008-0023913 | 3/2008 |
| WO | WO 99/53373 | 10/1999 |
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/225,184, filed Sep. 2, 2011, Wang et al.
U.S. Appl. No. 13/360,378, filed Jan. 27, 2012, Zhang.
U.S. Appl. No. 13/370,186, filed Feb. 9, 2012, Wang et al.
U.S. Appl. No. 13/371,293, filed Feb. 10, 2012, Zhang et al.
U.S. Appl. No. 13/482,913, filed May 29, 2012, Sprague.
U.S. Appl. No. 13/551,541, filed Jul. 17, 2012, Yang et al.
U.S. Appl. No. 13/952,136, filed Jul. 26, 2013, Hui Du et al.
U.S. Appl. No. 13/973,712, Aug. 22, 2013, Zang et al.

* cited by examiner

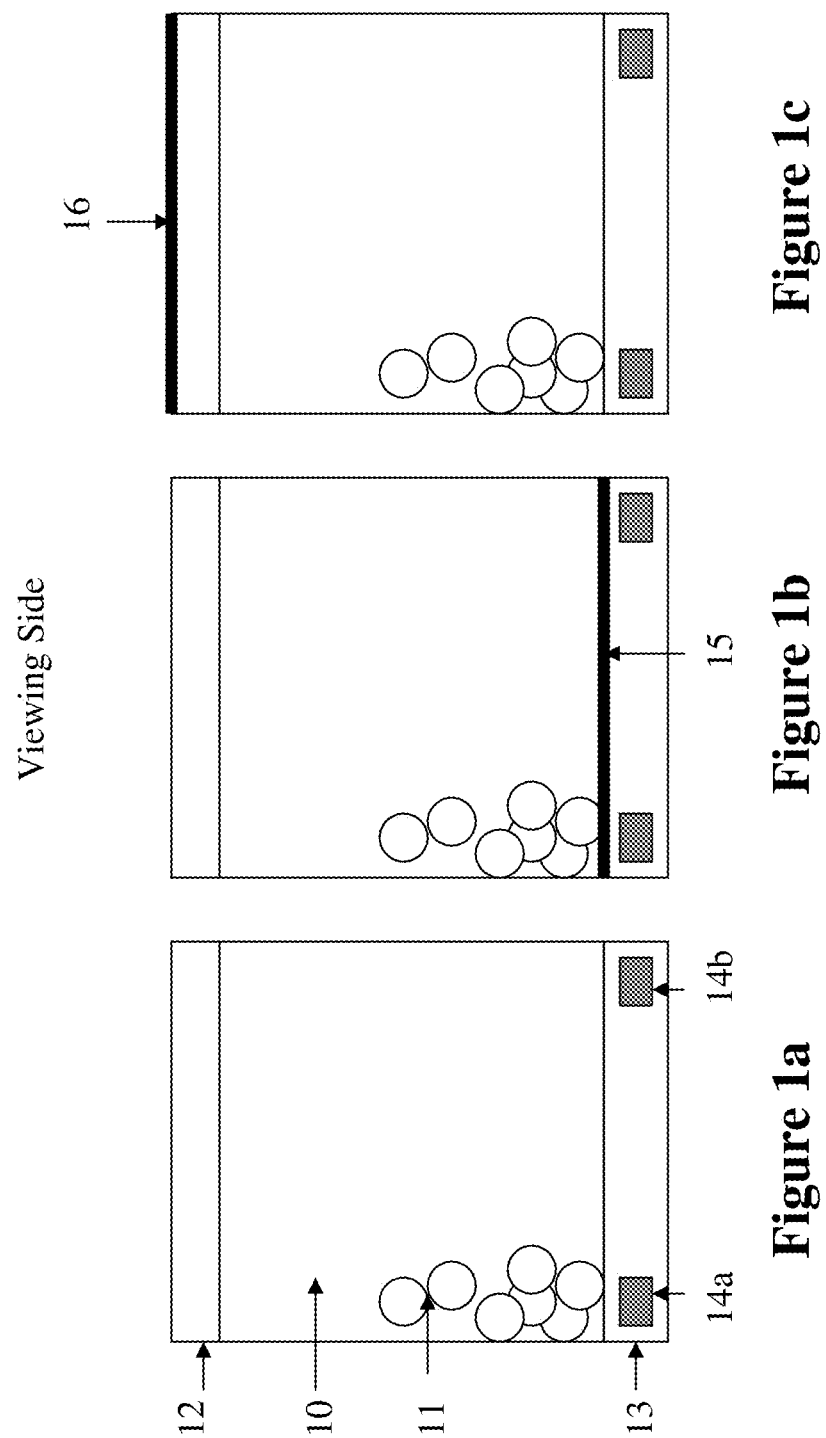

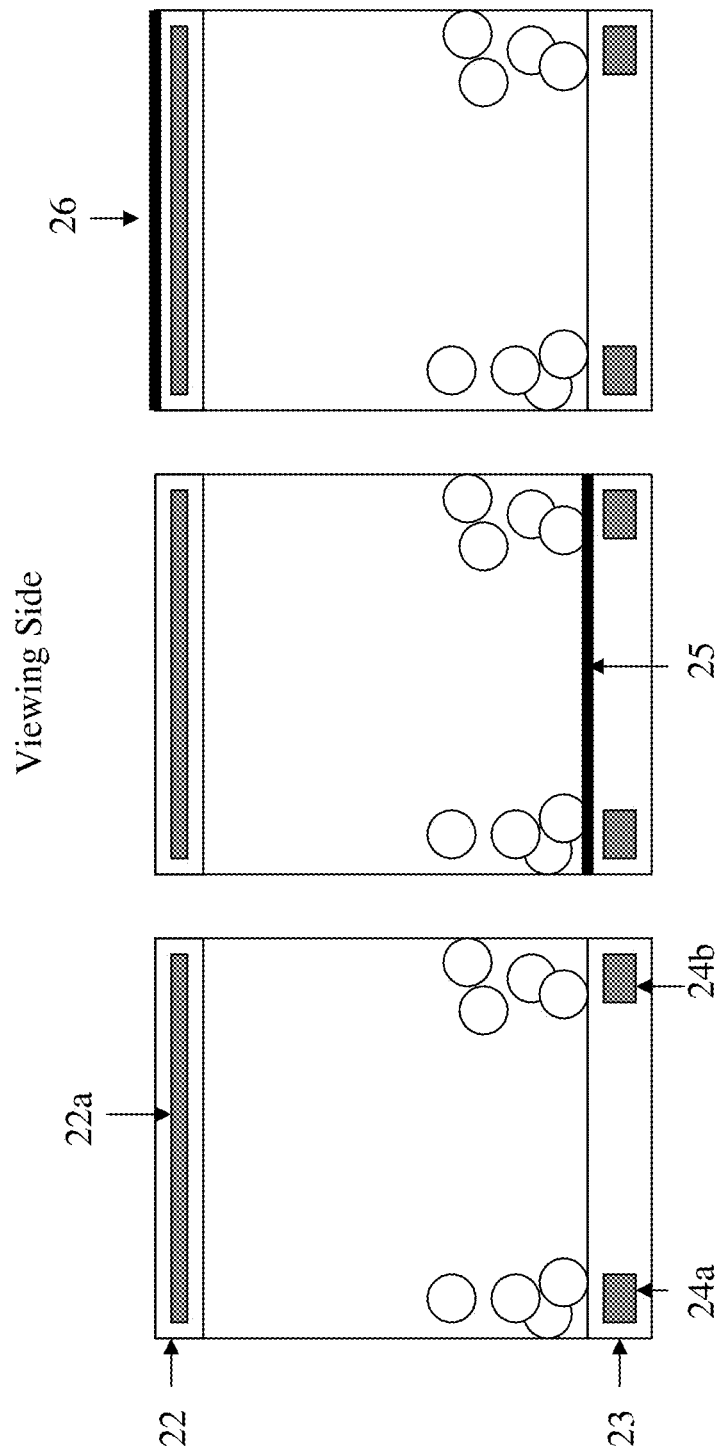

Viewing Side

LIGHT-ENHANCING STRUCTURE FOR ELECTROPHORETIC DISPLAY

FIELD OF THE INVENTION

The present invention is directed to a light-enhancing structure for an electrophoretic display device. The light-enhancing structure can enhance the colors displayed by the display device, especially the colors displayed through lateral switching of the charged pigment particles in an electrophoretic fluid.

BACKGROUND OF THE INVENTION

The electrophoretic display (EPD) is a non-emissive device based on the electrophoresis phenomenon of charged pigment particles dispersed in a solvent. The display typically comprises two plates with electrodes placed opposing each other. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

Alternatively, an electrophoretic fluid may comprise two types of charged pigment particles of contrasting colors and carrying opposite charges, and the two types of the charged pigment particles are dispersed in a clear solvent or solvent mixture. In this case, when a voltage difference is imposed between the two electrode plates, the two types of the charged pigment particles would move to opposite ends (top or bottom) in a display cell. Thus one of the colors of the two types of the charged pigment particles would be seen at the viewing side of the display cell.

The two types of electrophoretic display described above may involve vertical switching of the charged pigment particles. In other words, the charged pigment particles may be driven to move up and down, resulting in the charged pigment particles to be near or at either the top electrode plate or the bottom electrode plate.

An alternative driving mechanism involves lateral movement of the charged pigment particles. With this driving method, either the bottom of the display cell or the color of the solvent in which the charged pigment particles are dispersed will be exposed from the viewing side of the display cell. One of the disadvantages of the lateral switching method is that the colors displayed may appear washed-out under sun light, which would significantly impact on the quality of the images displayed.

SUMMARY OF THE INVENTION

The present invention is directed to a display device comprising:
(a) a display fluid layer comprising micro-containers filled with a display fluid and said display fluid layer is sandwiched between a first substrate layer and a second substrate layer wherein the first substrate layer is on the viewing side;
(b) a light-enhancing layer between the display fluid layer and the second substrate layer; and
(c) electrodes on the second substrate layer which can drive the display fluid laterally.

In one embodiment, the display fluid is an electrophoretic fluid comprising charged pigment particles dispersed in a solvent or solvent mixture and the display device is capable of showing a color by laterally switching the charged pigment particles.

In one embodiment, the electrodes on the second substrate layer are in-plane electrodes.

In one embodiment, the first substrate layer comprises a common electrode.

In one embodiment, the first substrate layer comprises a common electrode and the second substrate layer comprises a plurality of bottom electrodes and in-plane electrodes.

In one embodiment, the electrodes on the second substrate layer are of different sizes.

In one embodiment, the charged pigment particles are of one color and carrying the same charge polarity.

In one embodiment, the charged pigment particles are of two colors and carrying opposite charge polarities.

In one embodiment, the display device further comprises a color layer.

In one embodiment, the light-enhancing layer is a layer of a particulate material dispersed in a solid medium. In one embodiment, the difference between the refractive index of the particulate material and the refractive index of the medium is at least about 0.3. In one embodiment, the particulate material is selected from the group consisting of oxides or nitrides of Ti, Zn, Zr, Ba, Ca, Mg, Fe, Al, Si, Au, Ag, Mn, Co, Ni, Cu, Sn or C. In one embodiment, the particulate material is carbon nano tube, graphene or fullerene. In one embodiment, the solid medium is a polymer glue, a polymer adhesive or an inorganic material.

In one embodiment, the light-enhancing layer is a roughened reflector.

In one embodiment, the light-enhancing layer is an array of microlens.

In one embodiment, the light-enhancing layer is a film comprising a dispersion of a particulate material in a liquid medium. In one embodiment, the particular material is selected from the group consisting of oxides or nitrides of Ti, Zn, Zr, Ba, Ca, Mg, Fe, Al, Si, Au, Ag, Mn, Co, Ni, Cu, Sn or C and any transparent materials. In one embodiment, the difference between the refractive index of the particulate material and the refractive index of the liquid medium is at least about 0.3.

In one embodiment, the display fluid is an electrophoretic fluid comprising charged pigment particles dispersed in a gas or gas mixture and the display device is capable of showing a color by laterally switching the charged pigment particles.

In one embodiment, the display fluid is an electro-wetting fluid comprising liquid drops and the display device is capable of showing a color by laterally driving the electro-wetting fluid.

BRIEF DESCRIPTION OF THE DRAWINGS

FIGS. 1-7 illustrate examples of how an electrophoretic display is structured with lateral switching of the charged pigment particles.

DETAILED DESCRIPTION OF THE INVENTION

Figure 3B:
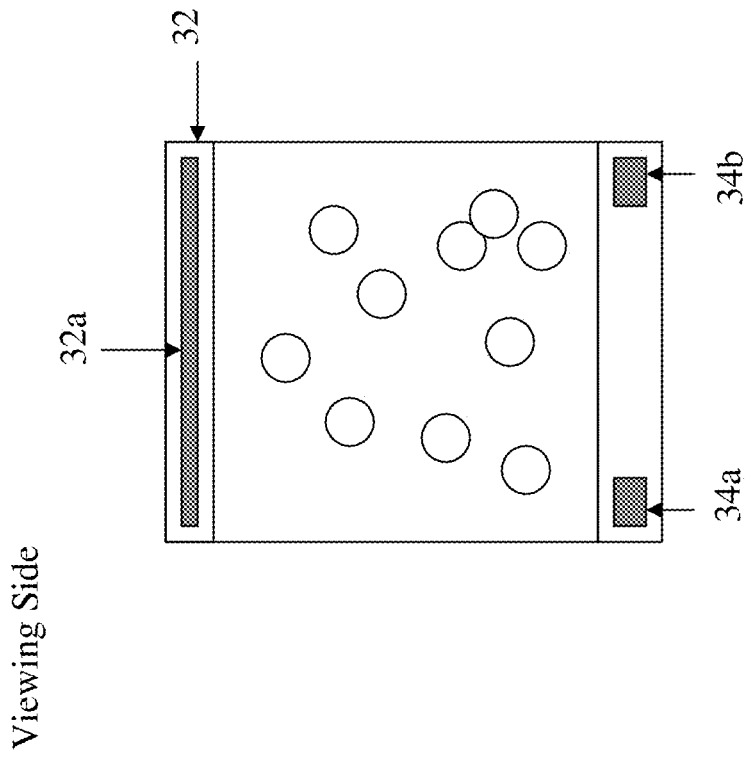

FIGS. 1-7 illustrate examples of how an electrophoretic display is structured with lateral switching of the charged pigment particles.

In FIG. 1a, a display fluid (10) comprising only one type of charged pigment particles (11) is sandwiched between a first substrate layer (12) and a second substrate layer (13) comprising two in-plane electrodes (14a and 14b). When a proper voltage potential difference is imposed between the two in-plane electrodes, the charged pigment particles would move to be near or at one of the in-plane electrodes. Therefore in this case, the color of the solvent in which the charged pigment particles are dispersed is seen from the viewing side.

In FIG. 1b, the design is similar to that in FIG. 1a, except that there is a color layer (15) on top of the second substrate layer (13). The color layer may be a color adhesive layer. In this case, the color seen from the viewing side would be a composite color of the solvent and the color layer.

While it is shown in the figure that the color layer is on top of the second substrate layer, it is also possible that the color layer is underneath the second substrate layer if the second substrate layer is transparent. Alternatively, the second layer itself may serve as a color layer, the color of which in combination with the color of the solvent is seen from the viewing side.

FIG. 1c depicts another alternative in which a top color layer (16) is on top of the first substrate layer (12). The color layer may also be underneath the first substrate layer (not shown).

In FIGS. 2a-2c, the first substrate layer (22) comprises a common electrode (22a). When a proper voltage potential difference is imposed between the common electrode (22a) and the two in-plane electrodes (24a and 24b) on the second substrate layer (23), the charged pigment particles would move to be near or at both in-plane electrodes, causing the color of the solvent (in FIG. 2a), or a composite color of the solvent and a color layer (25) associated with the second substrate layer (23) (in FIG. 2b) or the composite color of the solvent and a top color layer (26) (in FIG. 2c), to be seen from the viewing side.

Figure 3A:
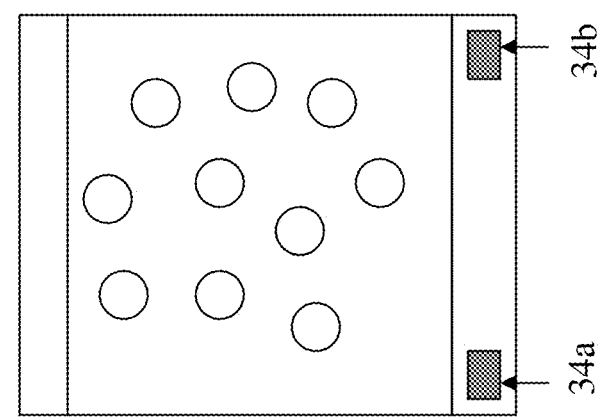

In FIG. 3a, there is no voltage potential difference applied between in-plane electrodes 34a and 34b, therefore the charged pigment particles are scattered in the solvent in which they are dispersed. Alternatively, as shown in FIG. 3b, there are no voltage potential difference applied between the common electrode (32a) and the two in-plane electrodes (34a and 34b) which causes the charged pigment particles to scatter in the solvent. In both cases, the color seen from the viewing side is the color of the pigment particles.

Figure 4:
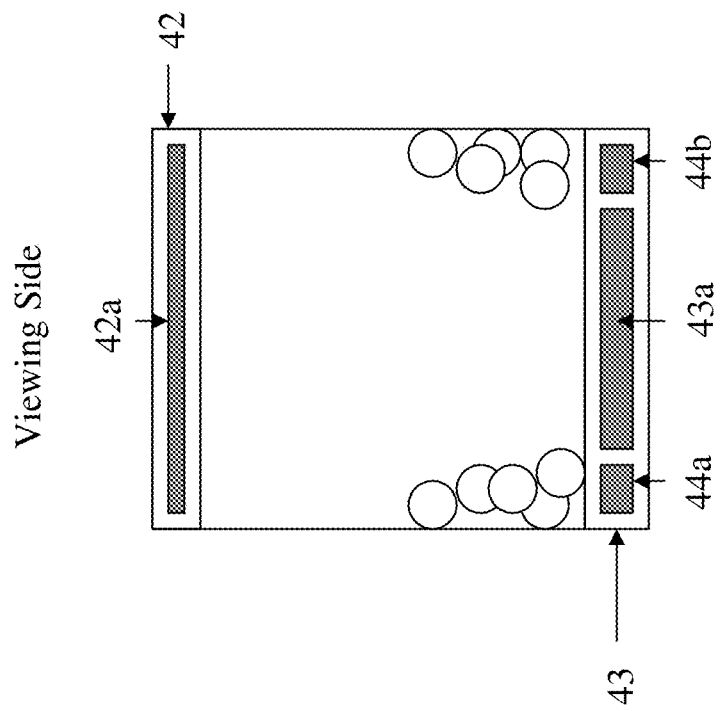

FIG. 4 depicts a dual switching mode. In this design, the first substrate layer (42) comprises a common electrode (42a) and the second substrate layer (43) comprises one bottom electrode (43a) and two in plane electrodes (44a and 44b) on each side of the bottom electrode. The charged pigment particles may move vertically (up/down) or laterally (sideways). As shown in the figure, when the charged pigment particles move to be near or at the in-plane electrodes, the color of solvent is seen from the viewing side. It is also possible for this design to have a color layer close to the second substrate layer (such as seen in FIG. 1b) or a top color layer close to the first substrate layer (such as seen in FIG. 1c).

Figure 5:
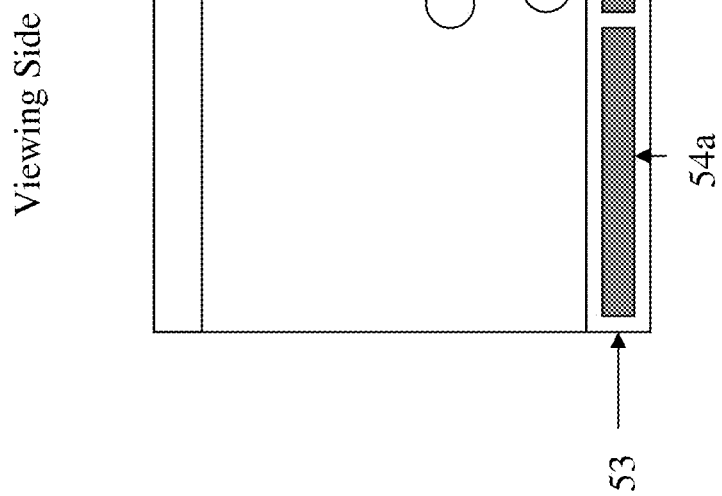

FIG. 5 shows another alternative design in which the second substrate layer comprises two pixel electrodes (54a and 54b). One of the pixel electrodes is significantly larger than the other pixel electrode, in area. Therefore when the charged pigment particles move to be near or at the smaller pixel electrode, the composite color of the solvent and the larger pixel electrode is seen from the viewing side. Again it is also possible to add a color layer close to the second substrate layer (such as seen in FIG. 1b) or a top color layer close to the first substrate layer (such as seen in FIG. 1c).

Figure 6A:
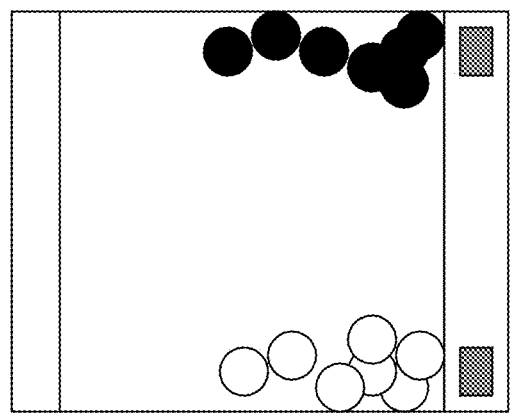
Figure 6B:
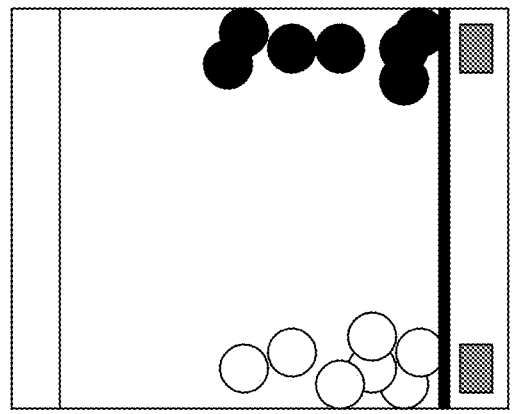
Figure 6C:
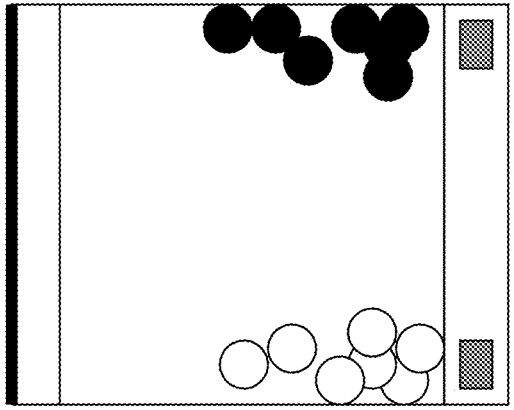
Figure 7A:
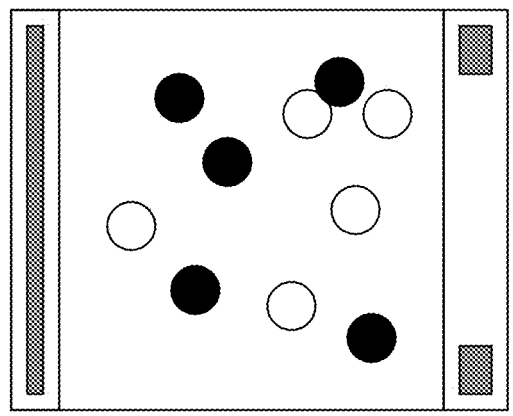
Figure 7B:
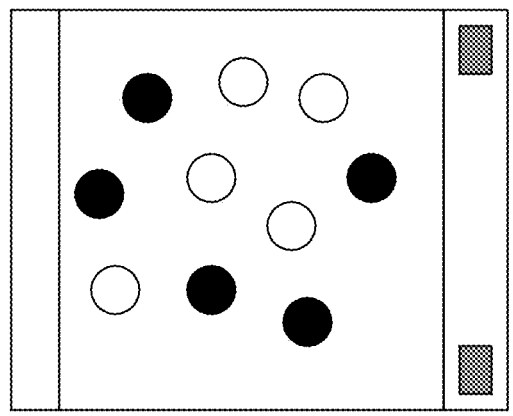

FIGS. 6a-6b show the same structural designs as those of FIGS. 1a-1c. However in this case, the fluid comprises two types of charged pigment particles dispersed in a solvent or solvent mixture.

Similar to FIGS. 3a and 3b, FIGS. 7a and 7b depict an example in which the particles are scattered in a solvent or solvent mixture, except that the display fluid comprises two types of charged pigment particles. In this case, the color seen at the viewing side is the colors of the two types of pigment particles.

The color layer shown in any of the figures, as stated, may be an adhesive layer. The color may be introduced by adding a dye or pigment to the layer.

In the examples as shown in the figures, the color seen from the viewing side may be the color of the solvent, a composite color of the solvent and a color layer or the color of the particles. However, these colors could appear washed-out, especially under strong ambient sunlight.

Figure 8A:
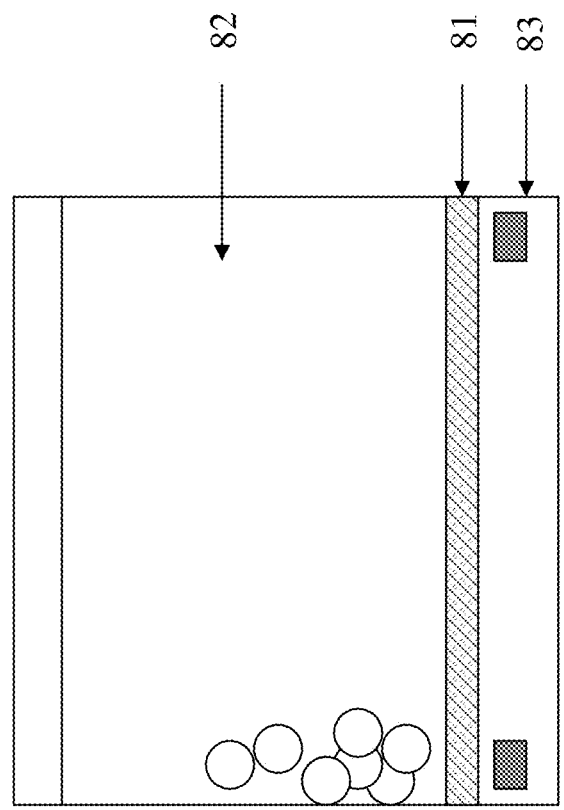
FIGS. 8a-8f depict electrophoretic displays with a light-enhancing structure of the present invention.

The present inventors now have found that the intensity of the colors displayed by the lateral switching mode may be greatly enhanced if a light-enhancing structure (81) is placed between a display fluid layer (82) and the bottom electrode layer (83) (i.e., the second substrate layer in FIGS. 1-7), as shown in FIG. 8a.

Figure 8B:
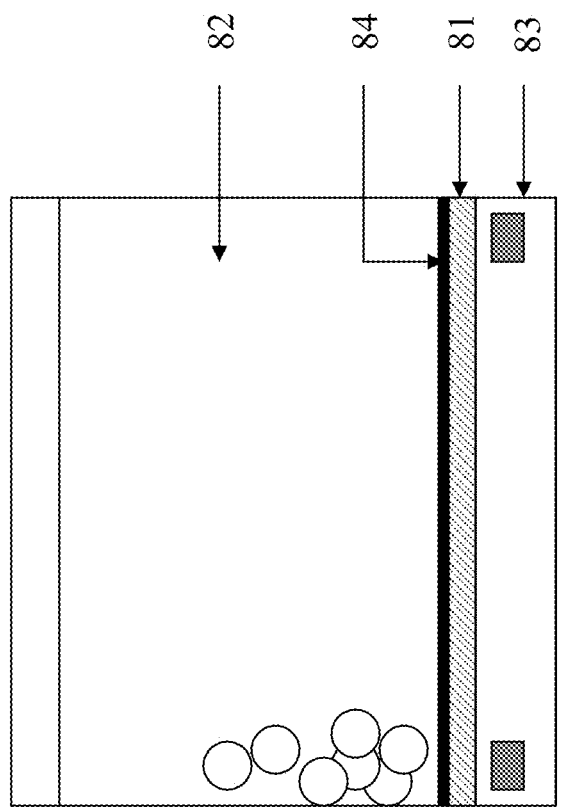

If there is a color layer as shown in FIG. 8b, the color layer (84) may be placed on top of the light-enhancing structure (81) and the color layer is transparent.

Figure 8C:
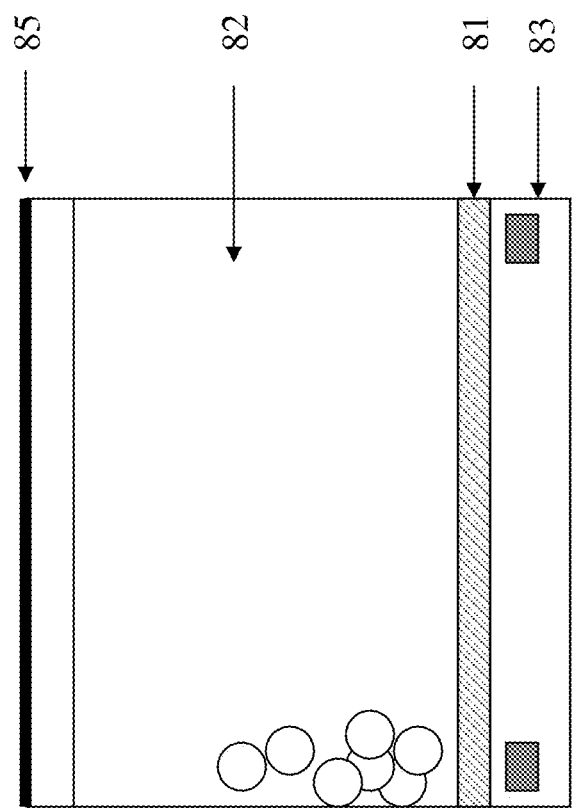
Figure 8D:
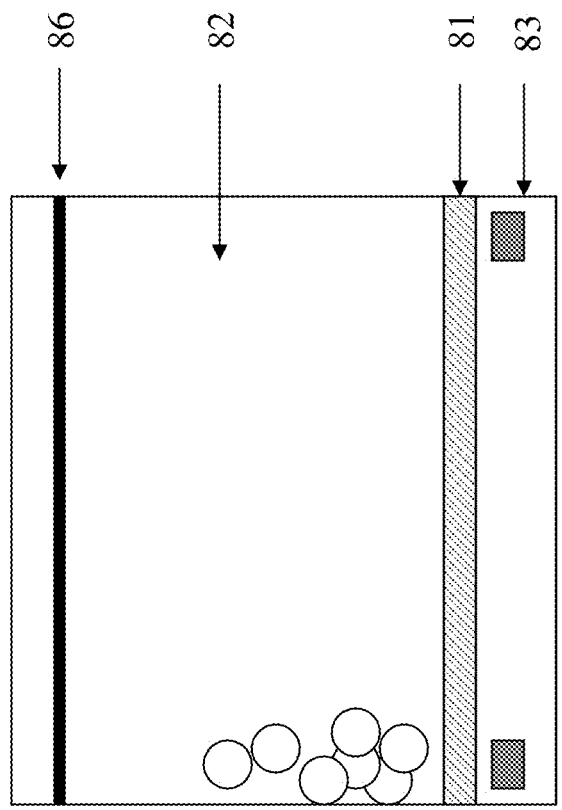

FIGS. 8c and 8d show additional options where the color layer (85 or 86) is above or underneath the first substrate layer.

Figure 8E:
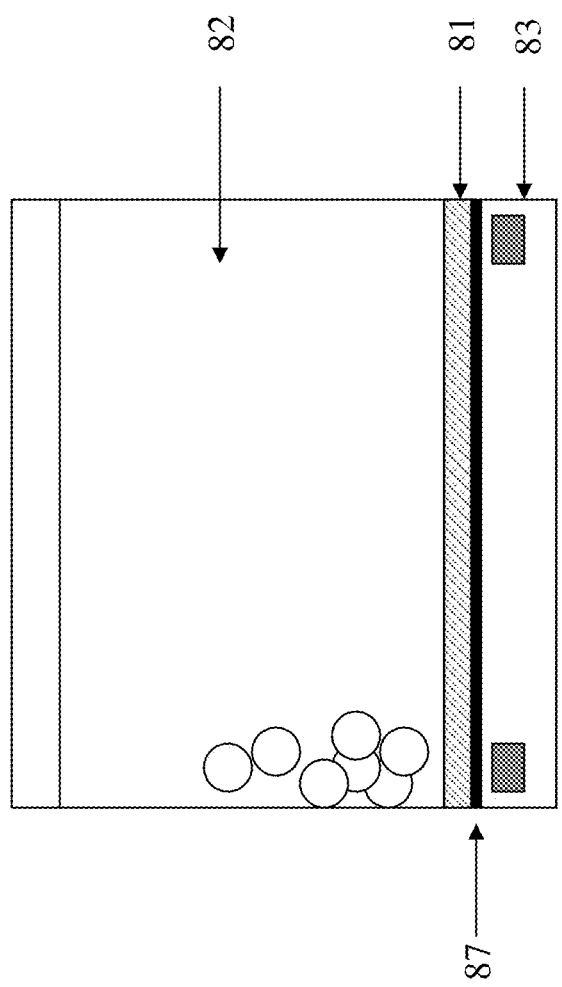
Figure 8F:
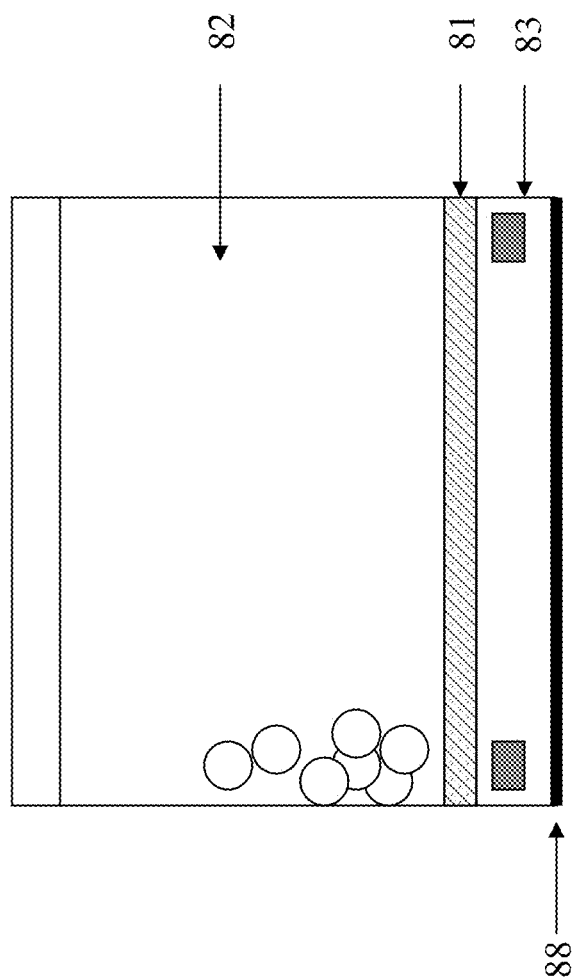

Alternatively, a color layer (87 or 88) may be placed underneath the light-enhancing layer (81), as shown in FIGS. 8e and 8f. In this case, the light-enhancing layer needs to be transparent.

The term "light-enhancing structure or layer" may also be referred to as a light-scattering structure or layer. The word "scatter" refers to a process in which light is scattered by a small volume of a variant refractive index. This small volume may be in the form of a particle, a bubble, a droplet or even a density fluctuating substance.

Therefore, in one embodiment of the present invention, the light scattering structure may be a volumetric scattering layer, which comprises a medium containing a particulate material the refractive index of which is different from that of the medium in which the particulate material is dispersed. The difference between the refractive index of the particulate material and the refractive index of the medium is preferably at least about 0.3 and more preferably at least about 1.0.

Examples of the particulate material may include, but are not limited to, oxides or nitrides of Ti, Zn, Zr, Ba, Ca, Mg, Fe, Al, Si, Au, Ag, Mn, Co, Ni, Cu, Sn, C or the like.

Alternatively, metal carbonates or sulfates such as $CaCO_3$ or $BaSO_4$ may also be used as a shell or as an additive for the particulate material.

Alternatively, carbon nano tube, graphene or fullerene may be used as the particulate material.

The term "particulate material" in a medium may be particles, agglomerates, flakes, tubes or the like. Their size is usually in the micro-meter range.

In this embodiment, the medium may be a solid material, such as polymer glue, a polymer adhesive or an inorganic material. The particulate material may be charged or non-charged.

In another embodiment, the light-enhancing structure may be a roughened reflector placed between the bottom electrode layer and the display fluid layer. The roughness of this roughened layer may be several nanometers to several micrometers (i.e., the vertical distance between the highest peak and the lowest valley of the surface). The roughening process used may be physical or chemical. For physical roughening, several techniques can be used. Examples include, but are not limited to, dry etching by ion bombarding. For chemical roughening, one of the possible methods is wet-etching by a chemical etchant. The roughened layer may be formed of a polymer, metal, semiconductor, paper or the like.

In a further embodiment, the scattering structure may be an array of microlens. The microlens is a small lens the diameter of which is less than about one millimeter. The microlens can be fabricated by micro-embossing or photolithography. These advanced semiconductor-like techniques have made the manufacture of microlens more cost effective.

In addition, the microlens can also be made by a self-assembly process, by which a lens-like shape of a material may be formed, following the lowest energy state in thermodynamics of the material. In one approach, a hydrophobic material is used to form the microlens on a substrate. Suitable hydrophobic materials for this purpose may include, but are not limited to, PMMA (poly(methyl methacrylate)), PDMS (polydimethylsiloxane) or any other similar organic or polymeric materials.

A further example of a light-enhancing structure may be a film comprising a dispersion of a particulate material. The particulate material is non-charged and it is dispersed in a liquid medium. The dispersion is partitioned in individual micro-structures. The micro-structures may be microcapsules. The encapsulated dispersion is embedded in a binder material to form a light-enhancing layer.

The particular material may be selected from the group consisting of oxides or nitrides of Ti, Zn, Zr, Ba, Ca, Mg, Fe, Al, Si, Au, Ag, Mn, Co, Ni, Cu, Sn, C or any transparent materials. For example, the particulate material may include, but are not limited to, silicon oxide, silicon nitride or any transparent materials. The most suitable materials for this purpose are silica, alumina, silver, gold, titania, carbon nanotube or the like. Other than particles, the material may also be in the form of agglomerates, flakes or tubes.

This light-enhancing layer may then be roughened by any of the methods as described above; but the roughening is optional.

It is also possible for the micro-structures to be microcups as those described in U.S. Pat. No. 6,930,818, the content of which is incorporated herein by reference in its entirety.

Suitable solvents, for this purpose, may be any organic or inorganic solvents. The solvent may be made colored by a dye or pigment. The color of the light-enhancing layer may also be from color filters attached to the color enhancing layer.

The refractive index of the particulate material dispersed in the solvent, in this embodiment, is also preferably different from that of the solvent. More preferably, the difference in the refractive indices is at least about 0.3.

While electrophoretic display is specifically mentioned, it is noted that the present invention may also be applied to other types of display devices, such as electrowetting display or liquid crystal display.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A display device comprising:
(a) a display fluid layer comprising micro-containers filled with a display fluid, said display fluid layer is sandwiched between a first substrate layer and a second substrate layer, wherein the first substrate layer is on the viewing side and the second substrate layer comprises electrodes which drive the display fluid laterally; and
(b) a light-enhancing layer between the display fluid layer and the second substrate layer,
wherein:
the display fluid is an electrophoretic fluid comprising charged pigment particles dispersed in a solvent or solvent mixture and the display device is capable of showing a color by laterally switching the charged pigment particles, and
the light-enhancing layer is an array of microlens.

2. The display device of claim 1, wherein the electrodes are in-plane electrodes.

3. The display device of claim 2, wherein the first substrate layer comprises a common electrode.

4. The display device of claim 1, wherein the first substrate layer comprises a common electrode and the second substrate layer comprises a plurality of bottom electrodes and in-plane electrodes.

5. The display device of claim 1, wherein the electrodes are of different sizes.

6. The display device of claim 1, wherein the charged pigment particles are of one color and carrying the same charge polarity.

7. The display device of claim 1, wherein the charged pigment particles are of two colors and carrying opposite charge polarities.

8. The display device of claim 1, further comprising a color layer.

* * * * *